(12) United States Patent
Shah et al.

(10) Patent No.: US 10,553,119 B1
(45) Date of Patent: Feb. 4, 2020

(54) ROADSIDE ASSISTANCE SYSTEM

(71) Applicant: Allstate Insurance Company, Northbrook, IL (US)

(72) Inventors: Hiral T. Shah, Chicago, IL (US); Chetan Prakash Singh, Wheeling, IL (US); Subbu Arunachalam Sankara Narayanan, Chicago, IL (US); Paul R. Turnbull, Chicago, IL (US); Byron J. Williams, Chicago, IL (US); Nedier Janvier, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 16/151,929

(22) Filed: Oct. 4, 2018

(51) Int. Cl.
*G08G 1/00* (2006.01)
*G07C 5/00* (2006.01)
(Continued)

(52) U.S. Cl.
CPC .............. *G08G 1/205* (2013.01); *G06N 3/08* (2013.01); *G06Q 50/01* (2013.01); *G06Q 50/30* (2013.01);
(Continued)

(58) Field of Classification Search
CPC ............ G01C 21/3608; G07C 2205/02; G07C 5/006; G07C 5/008; G07C 5/0808;
(Continued)

(56) References Cited

U.S. PATENT DOCUMENTS 9,367,968 B2   6/2016  Giraud et al.
9,412,130 B2   8/2016  Wasserman et al.
(Continued)

FOREIGN PATENT DOCUMENTS

WO    2017210563 A1    12/2017

OTHER PUBLICATIONS

Vizard, Michael, "Urgent.ly Publishes Roadside Assistance API", API News, Feb. 13, 2015, downloaded on May 7, 2018 from https://www.programmableweb.com/news/urgent.ly-publishes-roadside-assistance-api/2015/02/13, 7 pages.
(Continued)

*Primary Examiner* — Quoc Thai N Vu
(74) *Attorney, Agent, or Firm* — Banner & Witcoff, Ltd.

(57) ABSTRACT

According to some aspects of this disclosure a roadside assistance application programming interface (API) may allow any type of application, internet of things device, voice recognition device, and others to provide roadside assistance functionality. According to some aspects of this disclosure a device may communicate with sensors or an on-board diagnostics system of a vehicle and retrieve vehicle data. The device may recommend a service based on the vehicle data. The device may send a request for roadside assistance. The device may be used to enroll a user as a member of a roadside assistance benefits program. The above mentioned steps may all be performed via a single application running on the device. According to some aspects of this disclosure a device may process a roadside assistance request and determine a roadside assistance service provider to send to a user that requested roadside assistance.

20 Claims, 11 Drawing Sheets

(51) Int. Cl.
  *G10L 15/22* (2006.01)
  *G06N 3/08* (2006.01)
  *G06Q 50/00* (2012.01)
  *G06Q 50/30* (2012.01)
  *G10L 25/30* (2013.01)

(52) U.S. Cl.
  CPC .............. *G07C 5/008* (2013.01); *G10L 15/22* (2013.01); *G10L 25/30* (2013.01); *G10L 2015/223* (2013.01)

(58) Field of Classification Search
  CPC .......... G08G 1/205; G06N 3/08; G06Q 10/20; G06Q 50/01; G06Q 50/30; G10L 15/22; G10L 15/30; G10L 25/30; G10L 2015/223
  See application file for complete search history.

(56) References Cited

U.S. PATENT DOCUMENTS

| | | |
|---|---|---|
| 2008/0015748 A1 | 1/2008 | Nagy |
| 2009/0193028 A1* | 7/2009 | Kaplan ............... G06F 16/2477 |
| 2013/0024060 A1 | 1/2013 | Sukkarie et al. |
| 2013/0226758 A1 | 8/2013 | Reitan |
| 2013/0290234 A1 | 10/2013 | Harris et al. |
| 2014/0067434 A1 | 3/2014 | Bourne et al. |
| 2014/0129080 A1 | 5/2014 | Leibowitz et al. |
| 2014/0188970 A1 | 7/2014 | Madhok et al. |
| 2016/0071333 A1 | 3/2016 | Haidar et al. |
| 2016/0092962 A1* | 3/2016 | Wasserman ........ G06Q 30/0631 705/26.7 |
| 2017/0078398 A1 | 3/2017 | Haidar et al. |
| 2017/0178243 A1 | 6/2017 | Brewer et al. |
| 2017/0277578 A1 | 9/2017 | Greenwood et al. |
| 2018/0091604 A1* | 3/2018 | Yamashita .............. H04L 67/16 |

OTHER PUBLICATIONS

"Towme—Urgently clone for on-demand tow trucks and road side assistance", downloaded May 7, 2018 from htttps://www.appscrip.com/uber-for-tow-trucks-uber-for-roadside-assistance-urgently-clone-honk-clone-clone-rapitow-clone-aaa-clone/, 3 pages.

"CES 2012: GM to launch OnStar API for apps that can control cars", L.A. Times, Jan. 13, 2012, downloaded May 7, 2018 from atimesblogs.latimes.com/technology/2012/01/ces-2012-gm-launches-onstar-api-for-apps-that-interact-with-cars.html, 2 pages.

Bouchard, Chris, "What If On-Demand Roadside Assistance Apps Could Help Prevent Vehicle Breakdowns?", VIN Basics Blog, Apr. 20, 2015, Downloaded on May 7, 2018 from https://vin.dataonesoftware.com/vin_basics_blog/author/chris-bouchard, 3 pages.

"Natural Language Processing", Wikipedia, downloaded Oct. 4, 2018 from https://en.wikipedia.org/wiki/Natural_language_processing, 10 pages.

Korbut, Daniil, "Recommendation System Algorithms", Recommendation System Algorithms—Stats and Bots, downloaded Oct. 4, 2018 from https://blog.statsbot.co/recommendation-system-algorithms-ba67f39ac9a3, 8 pages.

Renshaw, Jerry, "Car Sensors—What Are Car Sensors and How Do They Work?", Advance Auto Parts, downloaded Oct. 4, 2018 from https://shop.advanceautoparts.com/r/advice/cars-101/car-sensors-what-are-car-sensors-and-how-do-they-work, 11 pages.

"What Data is Available From OBD?", OBD Solutions, dowloaded Oct. 4, 2018 from https://www.obdsol.com/knowledgebase/on-board-diagnostics/what-data-is-available-from-obd/, 1 page.

Nov. 1, 2019—(WO) International Search Report & Written Opinion—PCT/US2019/054081.

\* cited by examiner

ROADSIDE ASSISTANCE SYSTEM

TECHNICAL FIELD

Various aspects of the disclosure generally relate to systems and methods of analyzing vehicle data to identify a need for roadside assistance and providing roadside assistance. Specifically, various aspects relate to systems and methods of analyzing, by a device, vehicle data generated by vehicle sensors, and generating and transmitting a request for roadside assistance based on the vehicle data.

BACKGROUND

A vehicle failure can happen unexpectedly and may be a difficult problem to solve for the driver of the vehicle. Vehicle-based computer systems, such as on-board diagnostics (OBD) systems and telematics devices, may be used in automobiles and other vehicles, and may be capable of collecting various vehicle data relating to a vehicle failure.

In addition, adding roadside assistance functionality to new or existing applications, internet of things devices, voice recognition devices and others can take a great deal of time and effort for developers. Application programming interfaces can assist developers by providing a set of microservices that allow developers to add functionality to an application. An application programming interface that provides a set of roadside assistance microservices would help remedy the above mentioned issues.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, apparatuses, computer-implemented methods, and computer-readable media for enabling roadside assistance functionality and evaluating data received from one or more devices to identify potential issues requiring roadside assistance. According to some aspects of this disclosure a roadside assistance application programming interface (API) may allow any type of application, internet of things device, voice recognition device, and others to provide roadside assistance functionality. The API may provide roadside assistance functionality to one or more applications, enabling developers to quickly and efficiently modify and add roadside assistance functionality in the one or more applications.

According to some aspects of this disclosure a device (such as a smart phone, tablet, listening device, etc.) may communicate with sensors or an on-board diagnostics system of a vehicle and retrieve vehicle data. The device may generate a recommendation for a service, such as a roadside assistance service, based on the vehicle data. The device may send a request for roadside assistance. The device may be used to enroll a user as a member of a roadside assistance benefits program. The above mentioned steps may all be performed via, in some examples, a single application executing on the device. According to some aspects of this disclosure a device may process a roadside assistance request and determine a roadside assistance service provider for a user that requested roadside assistance.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
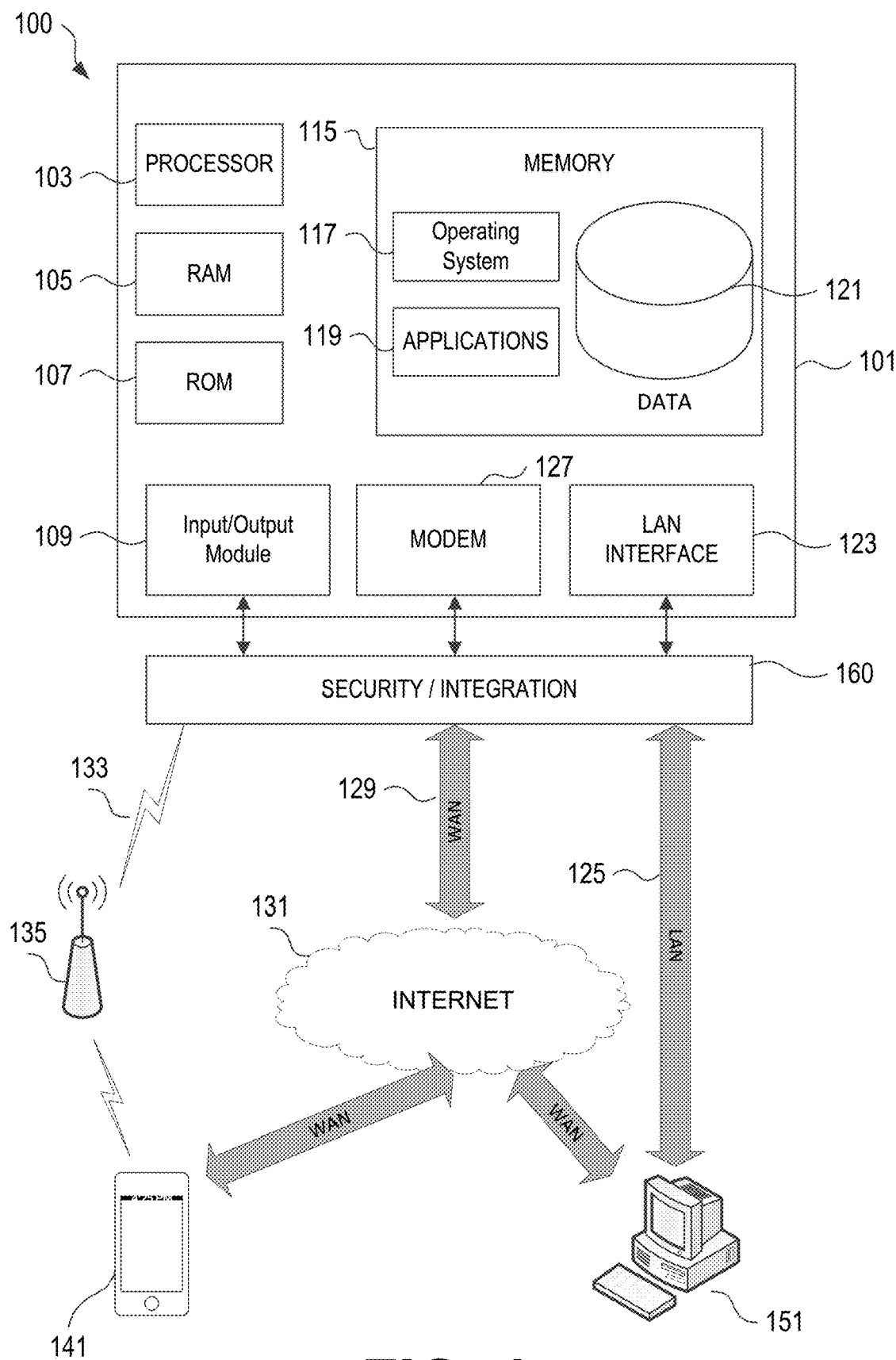
FIG. 1 illustrates a network environment and computer systems that may be used to implement aspects of the disclosure.

FIG. 1 illustrates a block diagram of a roadside assistance server 101 in a roadside assistance system 100 that may be used according to one or more illustrative embodiments of the disclosure. The roadside assistance server 101 may have a processor 103 for controlling overall operation of the device 101 and its associated components, including RAM 105, ROM 107, input/output module 109, and memory 115. The roadside assistance server 101, along with one or more additional devices (e.g., user device 141 and roadside service provider device 151, security and integration hardware 160) may correspond to any of multiple systems or devices, such as a mobile computing device or a roadside assistance server, configured as described herein for receiving and analyzing vehicle data from vehicle sensors, and providing roadside assistance services. User device 141 and roadside service provider device 151 may include some or all of the elements described below with respect to the roadside assistance server 101.

Input/Output (I/O) 109 may include a microphone, keypad, touch screen, and/or stylus through which a user of the roadside assistance server 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the roadside assistance server 101, such as an operating system 117, application programs 119, and an associated internal database 121. The database 121 may contain historical roadside service data. The database may contain membership data for users that are members of a roadside assistance benefits plan. Membership data may include information regarding the number and type of benefits that a member has. Membership data may include personal information for each member including date of birth, address, vehicle information, etc. The various hardware memory units in memory 115 may include volatile and nonvolatile, removable and non-removable media implemented in any method or technology for storage of information such as computer readable instructions, data structures, program modules or other data. Certain devices/systems within a roadside assistance system 100 may have minimum hardware requirements in order to support sufficient storage capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a user device 141, in order to store and/or execute a roadside assistance software application, receive and process sufficient amounts of vehicle data from various vehicle sensors 112 at a determined data sampling rate, and analyze vehicle data to provide roadside assistance services, etc. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the roadside assistance server 101, the user device 141, or roadside service provider device 151 to execute a series of computer-readable instructions. For example, processor(s) 103 may allow user device 141 to execute a roadside assistance software application that receives and stores vehicle data from vehicle sensors, analyzes the vehicle data, determines roadside assistance recommendations based on the vehicle data or otherwise provides roadside assistance functionality as described herein.

The roadside assistance server 101 may operate in a roadside assistance system 100 supporting connections to one or more remote devices, such as user device 141 and roadside service provider device 151. The user device 141 and roadside service provider device 151 may be personal computers, servers (e.g., web servers, database servers), or mobile communication devices (e.g., mobile phones, portable computing devices, on-board vehicle computing systems, and the like), and. The network connections depicted in FIG. 1 include a local area network (LAN) 125 and a wide area network (WAN) 129, and a wireless telecommunications network 133, but may also include other networks. When used in a LAN networking environment, the roadside assistance server 101 may be connected to the LAN 125 through a network interface or adapter 123. When used in a WAN networking environment, the server 101 may include a modem 127 or other means for establishing communications over the WAN 129, such as network 131 (e.g., the Internet). When used in a wireless telecommunications network 133, the roadside assistance server 101 may include one or more transceivers, digital signal processors, and additional circuitry and software for communicating with wireless computing devices 141 (e.g., mobile phones, portable customer computing devices, on-board vehicle computing systems, etc.) via one or more network devices 135 (e.g., base transceiver stations) in the wireless network 133.

Also illustrated in FIG. 1 is a security and integration layer 160, through which communications may be sent and managed between the roadside assistance server 101 and the remote devices (user device 141 and roadside service provider device 151) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the roadside assistance server 101. As an example, a security and integration layer 160 of a roadside assistance server operated by an insurance provider, financial institution, governmental entity, or other organization, may comprise a set of web application servers configured to use secure protocols and to insulate the roadside assistance server 101 from user device 141 and roadside service provider device 151. In some cases, the security and integration layer 160 may correspond to a set of dedicated hardware and/or software operating at the same physical location and under the control of same entities as roadside assistance server 101. For example, layer 160 may correspond to one or more dedicated web servers and network hardware in an organizational datacenter or in a cloud infrastructure supporting a cloud-based driving data analysis system. In other examples, the security and integration layer 160 may correspond to separate hardware and software components which may be operated at a separate physical location and/or by a separate entity.

As discussed below, the data transferred to and from various devices in the roadside assistance system 100 may include secure and sensitive data, such as vehicle sensor data, driving pattern data, and/or vehicle repair data. Therefore, it may be desirable to protect transmissions of such data by using secure network protocols and encryption, and also to protect the integrity of the data when stored in a database or other storage in a mobile device, roadside assistance server, or other computing devices in the roadside assistance system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in a roadside assistance system 100. Data may be transmitted through the security and integration layer 160, using various network communication protocols. Secure data transmission protocols and/or encryption may be used in file transfers to protect to integrity of the driving data, for example, File Transfer Protocol (FTP), Secure File Transfer Protocol (SFTP), and/or Pretty Good Privacy (PGP) encryption. In other examples, one or more web services may be implemented within the various devices in the roadside assistance system 100 and/or the security and integration layer 160. The web services may be accessed by authorized external devices and users to support input, extraction, and manipulation of the data (e.g., roadside assistance data, location data, vehicle sensor data, etc.) between the various devices in the roadside assistance system 100. Web services built to support roadside assistance system 100 may be cross-domain and/or cross-platform, and may be built for enterprise use. Such web services may be developed in accordance with various web service standards, such as the Web Service Interoperability (WS-I) guidelines. In some examples, a roadside assistance web service may be implemented in the security and integration layer 160 using the Secure Sockets Layer (SSL) or Transport Layer Security (TLS) protocol to provide secure connections between roadside assistance server 101 and various clients such as user device 141 and roadside service provider device 151. SSL or TLS may use HTTP or HTTPS to provide authentication and confidentiality. In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in roadside assistance system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the system. In such examples, a processor 103 may retrieve data from or write data to the CPU cache rather than reading/writing to memory 115, which may improve the speed of these operations. In some examples, a database cache may be created in which certain data from a database 121 (e.g., a vehicle sensor database, a historical roadside service database, etc.) is cached in a separate smaller database on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of roadside assistance systems, such as faster response times and less dependence on network conditions when transmitting/receiving roadside service software applications (or application updates), vehicle data, etc.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and system components described herein may be configured to communicate using any of these network protocols or technologies.

Additionally, one or more application programs 119 may be used by the various computing devices (e.g., roadside assistance server 101, user device 141, roadside service provider device 151, etc.) within a roadside assistance system 100 (e.g., vehicle sensor data analysis or roadside assistance request software applications), including computer executable instructions for receiving and storing vehicle sensor data from vehicle sensors, supporting applications that provide roadside assistance features, analyzing the vehicle sensor data to recommend a roadside service, and performing other roadside assistance functions as described herein.

Figure 2A:
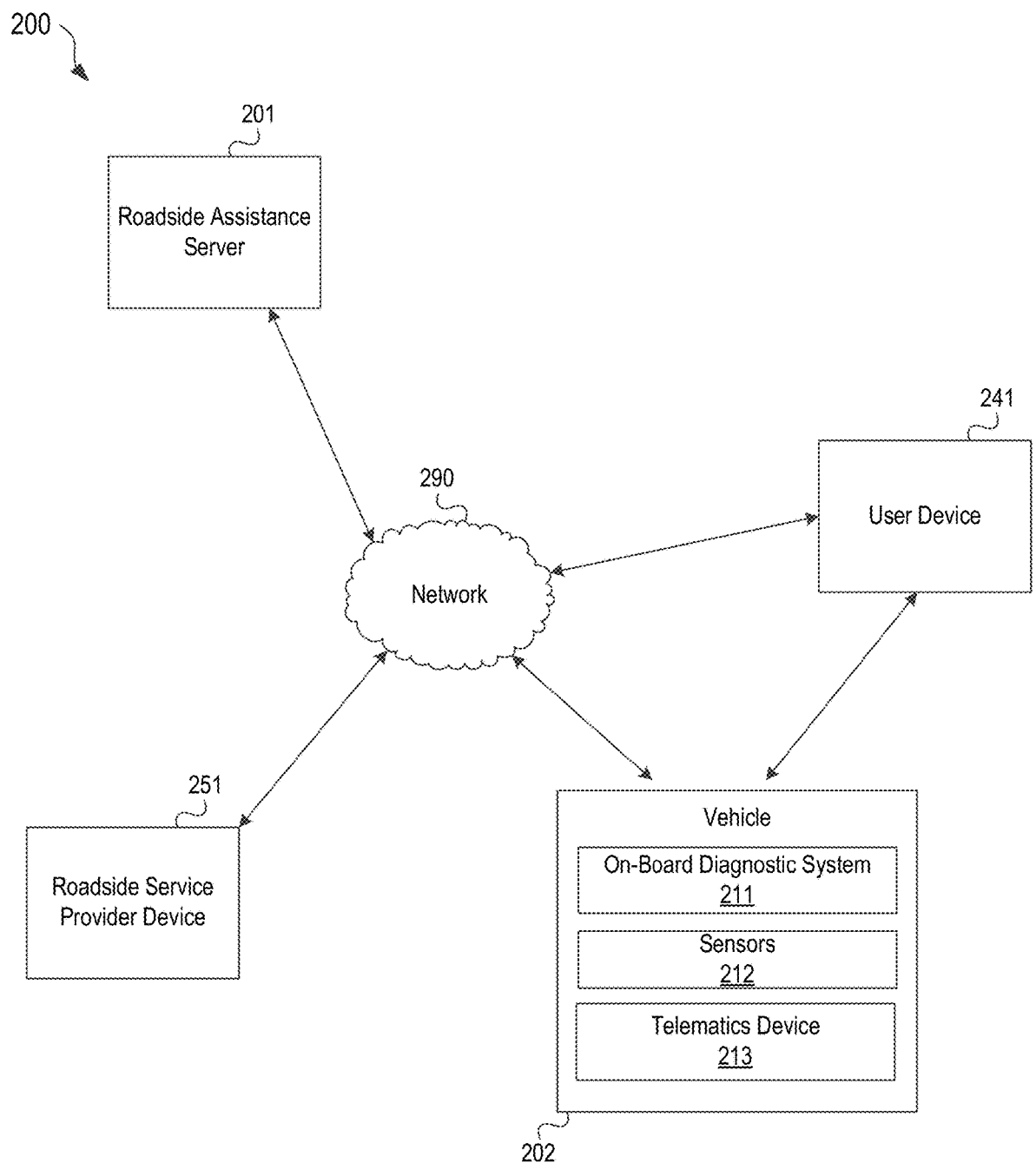
FIGS. 2a and 2b illustrate a computing environment for implementing a roadside assistance server and components of a roadside assistance server, respectively, according to one or more aspects of the disclosure.
Figure 2B:
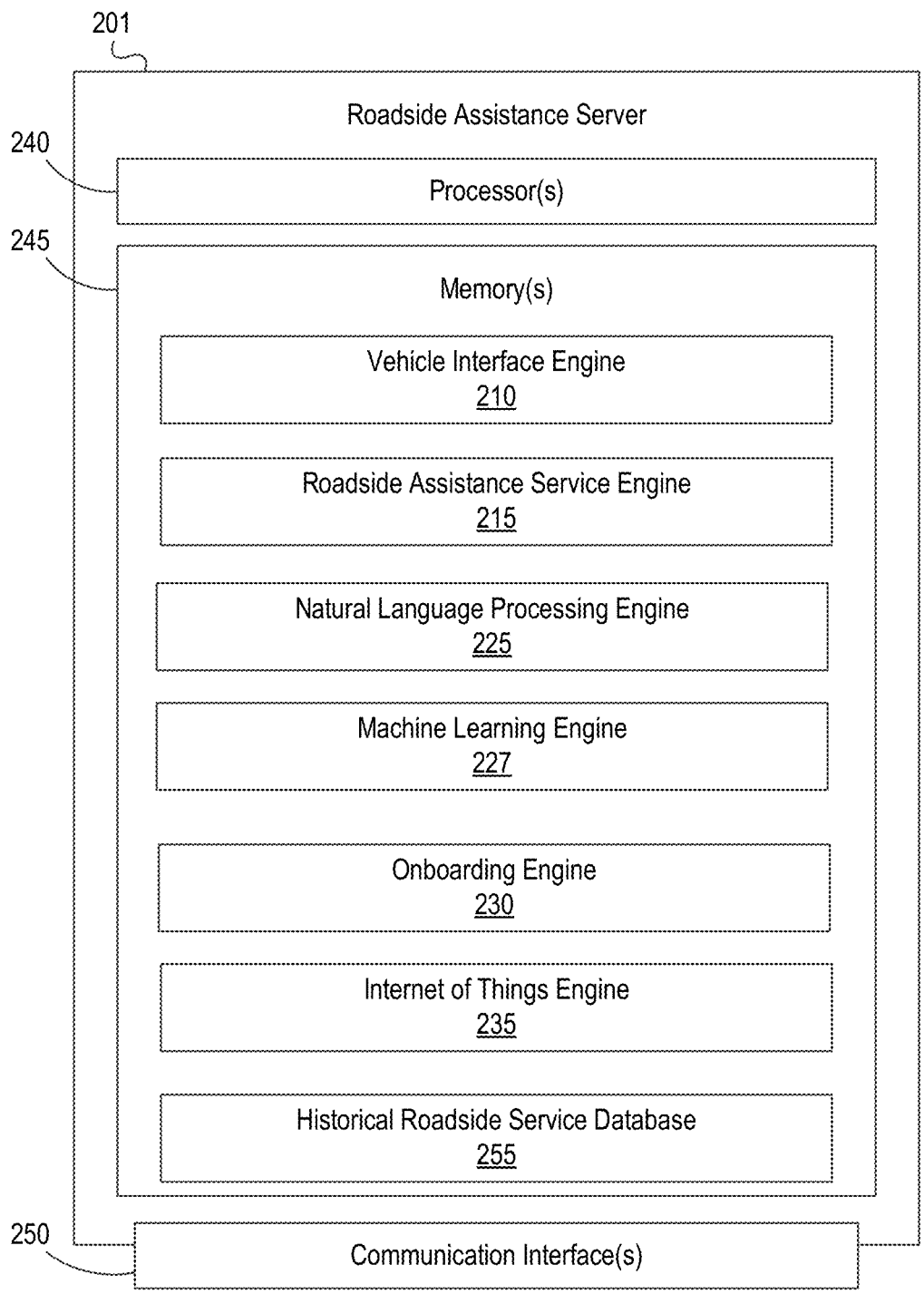

FIGS. 2a and 2b illustrate one example environment or system 200 for providing roadside assistance functionality in which the roadside assistance server may operate, and example components of a roadside assistance server, respectively. Referring to FIG. 2a, roadside assistance system 200 may include one or more computer systems. For example, roadside assistance system 200 may include a roadside assistance server 201, a user device 241, a vehicle 202, and a roadside service provider device 251. In some examples, roadside assistance server 201 may be a device separate from user device 241, while in other examples, roadside assistance server 201 may be part of a same device as user device 241. Any device within roadside assistance system 200 (e.g., roadside assistance server 201, user device 241, vehicle 202, roadside service provider device 251, or the like) may include one or more components of roadside assistance server 201 and/or any device from roadside assistance system 100 described in FIG. 1.

As illustrated in greater detail below, roadside assistance server 201 may include one or more components configured to perform one or more of the functions described herein. For example, roadside assistance server 201 may include one or more components configured to receive requests for roadside assistance, determine roadside service providers, and generate requests for roadside service providers.

In addition, and as illustrated in greater detail below, the roadside assistance server 201 may be configured to generate, host, transmit, and/or otherwise provide information for one or more web pages and/or other graphical user interfaces (which may, e.g., cause one or more other computer systems to display and/or otherwise present the one or more web pages and/or other graphical user interfaces). In some instances, the web pages, information, and/or other graphical user interfaces generated by roadside assistance server 201 may be associated with an external portal, web page, or application provided by an organization. The web pages, information, and/or other graphical user interfaces may allow the user to request roadside assistance and view details related to a roadside assistance service that is ongoing or finished.

User device 241 may be a smartphone, personal digital assistant, voice recognition assistant, laptop computer, tablet computer, desktop computer, smart home device, listening device, infotainment head unit of a vehicle, or the like configured to perform one or more functions described herein. For instance, user device may be configured to communicate with a vehicle, make a recommendation for roadside assistance based on data obtained from a vehicle, and request roadside assistance. Although roadside assistance system 200 as shown includes a single user device 241, it should be understood that the roadside assistance system 200 may include any number of user devices similar to user device 241.

In addition, user device 241 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by user device 241 may be associated with an external portal, web page, or application provided by an organization. The web pages, information, and/or other graphical user interfaces may allow the user to request roadside assistance and view recommendations, status of service, and other details related to a roadside assistance service that is ongoing or finished.

Roadside service provider device 251 may be a smartphone, personal digital assistant, voice recognition assistant, laptop computer, tablet computer, desktop computer, smart home device, listening device, infotainment head unit of a vehicle, or the like configured to perform one or more functions described herein. For instance, roadside service provider device 251 may transmit updates regarding a roadside service to user device 241 or roadside assistance server 201. Although roadside assistance system 200 as shown includes a single roadside service provider device 251, it should be understood that the roadside assistance system 200 may include any number of user devices similar to roadside service provider device 251.

The vehicle 202 may include sensors 212 capable of detecting and recording various conditions at the vehicle and operational parameters of the vehicle. For example, sensors 212 may detect and store data corresponding to the vehicle's speed, distances driven, rates of acceleration or braking, and specific instances of sudden acceleration, braking, and swerving. Sensors 212 also may detect and store data received from the vehicle's 212 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Sensors 212 may detect and store the external driving conditions, for example, external temperature, rain, snow, light levels, and sun position for driver visibility. Sensors 212 also may detect and store data relating to moving violations and the observance of traffic signals and signs by the vehicle 202. Sensors 212 may detect and store data relating to the maintenance of the vehicle 202, such as the engine status, oil level, engine coolant temperature, odometer reading, the level of fuel in the fuel tank, engine revolutions per minute (RPMs), and/or tire pressure.

Sensors 212 may include one or more cameras and proximity sensors capable of recording additional conditions inside or outside of the vehicle 202. Internal cameras may detect conditions such as the number of the passengers in the vehicle 202, and potential sources of driver distraction within the vehicle (e.g., pets, phone usage, unsecured objects in the vehicle). External cameras and proximity sensors may detect other nearby vehicles, traffic levels, road conditions, traffic obstructions, animals, cyclists, pedestrians, and other conditions.

The sensors 212 may store data within the vehicle 202, and/or may transmit the data to one or more external devices (e.g., roadside assistance server 201, roadside service provider device 251, and/or a user device 241). The sensors may be configured to transmit data to external devices via a telematics device 213. In other examples, one or more of the sensors 212 may be configured to transmit data directly without using a telematics device 213. Telematics device 213 may be optional in certain embodiments where one or more sensors 212 within the vehicle 202 may be configured to independently capture, store, and transmit vehicle operation and driving data.

Sensors may include oxygen sensors, engine speed sensors, mass air flow sensors, fuel temperature sensors, manifold absolute pressure (MAP) sensors, cameras (including forward looking side cameras, rearward looking side cameras, rear view cameras), radar sensors, accelerometers, GPS, and/or ultrasonic sensors. The vehicle interface engine may communicate directly with the different sensors or it may communicate with the sensors via the OBD system 211 of the vehicle 202. The OBD system 211 may provide additional information such as the vehicle speed, acceleration and braking rates, and in some vehicles, information such as input from the steering wheel (e.g., the user is making a left turn or right turn). Additionally, the OBD system 211 may provide accelerometer information from an accelerometer aboard the vehicle. The OBD system 211 may generate diagnostic codes that indicate there is a problem with the vehicle 202.

Referring to FIG. 2b, roadside assistance server may include one or more processors 240, memory 245, and communication interface 250. A data bus may interconnect processor 240, memory 245, and communication interface 250. Communication interface 250 may be a network interface configured to support communication between roadside assistance server 201 and one or more networks (e.g., network 290, or the like). Memory 245 may include one or more program modules having instructions that when executed by processor 240 cause roadside assistance server 201 to perform one or more functions described herein and/or access one or more databases that may store and/or otherwise maintain information which may be used by such program modules and/or processor 240. In some instances, the one or more program modules and/or databases may be stored by and/or maintained in different memory units of roadside assistance server 201 and/or by different components that may form and/or otherwise make up roadside assistance server 201. For example, memory 245 may have, store, and/or include a vehicle interface engine 210, a machine learning engine 227, a roadside assistance service engine 215, an onboarding engine 230, a natural language processing engine 225, an internet of things engine 235, and/or a historical roadside service database 255. A roadside assistance API may comprise any component stored and/or included in memory 245. In some aspects, user device 241 and roadside service provider device 251 may include one or more components of the roadside assistance server 201, such that one or more processes or functions described herein with respect to roadside assistance server may be performed by one or more of user device 241 and/or roadside service provider device 251.

Roadside assistance server 201 may contain a vehicle interface engine 210. The vehicle interface engine 210 may communicate with a vehicle such as vehicle 202. The vehicle interface engine 210 may communicate using Bluetooth, Wi-Fi, an auxiliary cable that connects a mobile device to the vehicle 202, or any other wired or wireless communication method. The vehicle interface engine 210 may communicate with an on-board diagnostics (OBD) system 211 of the vehicle 202 to obtain information about parts of the vehicle that may need repair. The vehicle interface engine 210 may use machine learning with data obtained from the vehicle to recommend a service to a user.

Roadside assistance server 201 may contain a roadside assistance service engine 215. The roadside assistance service engine 215 may communicate with a roadside assistance service provider device 251. The roadside assistance service engine 215 may send information to a service provider device about the service that a user is requesting. For example, the roadside assistance service engine 215 may send a location of the vehicle 202 (e.g., based on global positing system (GPS) data received from the vehicle), the type of service needed for the vehicle (e.g., tow, jumpstart, flat tire repair, etc.), and/or information about the vehicle (e.g., make, model, year, mileage, etc.). The information sent to a service provider may be obtained from other components of the roadside assistance server 201 such as the vehicle interface engine 210.

Roadside assistance server 201 may contain an onboarding engine 230. The onboarding engine 230 may provide enrollment and payment functionality to an application that interacts with the roadside assistance server 201. Onboarding engine 230 may include machine learning components for use in a recommender system. The onboarding engine 230 may recommend a benefit based on vehicle information and/or driver information. Driver information may include biographical information about the driver (age, marital status, education, etc.), and/or driving habits of the driver (e.g., how many miles the driver drives per year).

Roadside assistance server 201 may contain a natural language processing engine 225. Natural language processing engine 225 may provide information to an application to generate natural language for roadside assistance. Natural language processing engine 225 may provide information to a virtual assistant to enable the virtual assistant to generate natural language and obtain roadside services for a user. Natural language processing engine 225 may generate natural language to be output by a device. Natural language processing engine 225 may also perform speech recognition and natural language understanding on spoken or text input from a user.

Roadside assistance server 201 may contain a machine learning engine 227. Machine learning engine 227 may be configured to use machine learning (including decision trees, one or more neural networks, matrix factorization, etc.) to generate recommendations as described in step 320 of FIG. 3 and/or step 420 of FIG. 4.

Roadside assistance server 201 may contain an internet of things (IoT) engine 235. IoT engine 235 may provide roadside assistance functionality for IoT devices. The IoT engine 235 may provide microservices that require less memory and processing power to allow IoT devices to provide roadside assistance functionality. IoT devices may include smart home listening devices, sensors in communication with one or more home devices to detect performance characteristics of the device, kitchen appliances, wearable devices, etc.

Roadside assistance server 201 may contain a historical roadside service database 255. The historical roadside service database may contain data relating to roadside assistance requests as described in step 320 of FIG. 3.

Figure 3:
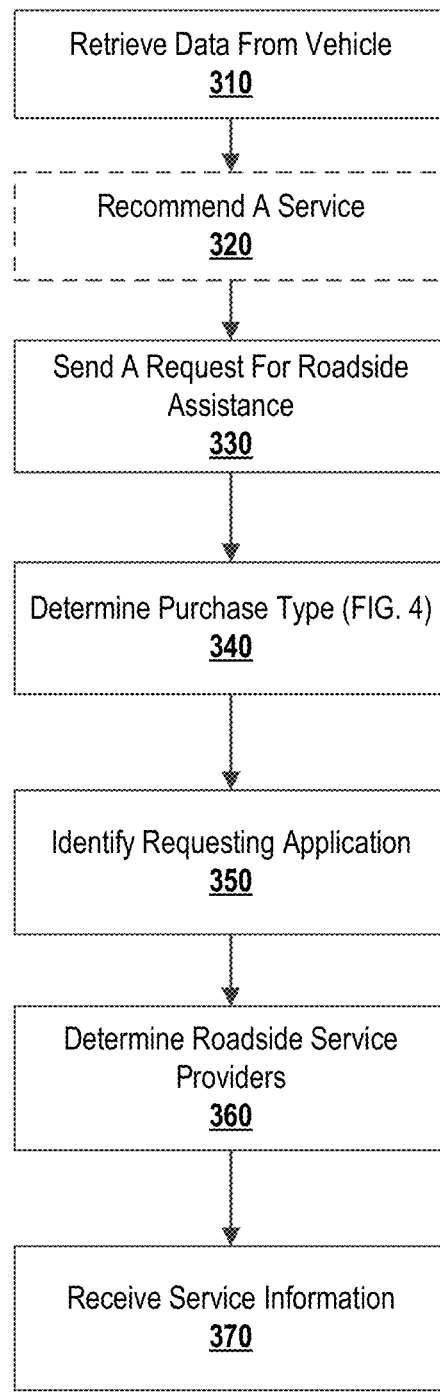
FIG. 3 is a flow diagram illustrating an example roadside assistance process using an example roadside assistance API, according to one or more aspects of the disclosure.

Referring to FIG. 3, a flow diagram is shown illustrating an example roadside assistance process using a roadside assistance API. The steps and various functionality described in reference to FIG. 3 may be performed by any component in system 200 such as mobile device 241, a roadside assistance server 201, roadside service provider device 251, or a combination of one or more devices and/or servers.

In step 310, roadside assistance system 200 may retrieve data from a vehicle. For example, vehicle interface engine 210 may be implemented on user device 241 and may receive vehicle information from vehicle 202. The vehicle interface engine may communicate with an on-board diagnostics (OBD) system 211 of the vehicle 202 to determine that the vehicle 202 needs repair. For example, the vehicle interface engine 210 may communicate with the OBD system 211 to determine that the vehicle 202 has a flat tire. The vehicle interface engine may send a notification with information regarding a repair to a user. The notification may be sent as soon as the vehicle interface engine 210 determines that a repair is needed. The timing of the notification may be based on the severity of the problem with the vehicle 202. For example, if the vehicle interface engine 210 determines that there is a high severity problem such as a flat tire, then the notification may be sent immediately. If the vehicle interface engine determines that there is a low severity problem such as a need for an oil change, the notification may be sent after the vehicle is put into park or turned off. The notification may provide the user with the option to request roadside assistance without opening an application on a device.

The vehicle interface engine 210 may obtain location information from a Global Positioning System (GPS) of the vehicle and may share the location with other components of the roadside assistance system 200. Sensors 212 (e.g., cameras) may be used to detect surroundings and provide additional location information. For example, cameras on the vehicle 202 may use object recognition to identify landmarks near the vehicle 202. The names of landmarks and/or images of landmarks may be shared with other devices within the roadside assistance system 200.

The vehicle interface engine 210 may communicate with sensors 212 of the vehicle 202. In one example, by communicating with the vehicle 202, the user device 241 may determine if the vehicle battery has enough power to start the vehicle 202. The system may send a user a notification indicating that the battery does not have enough power to start the vehicle. For example, the notification may be sent to device user device 241. The notification may ask the user if the user wants to proceed with roadside assistance for a jump start. If the user agrees to the jump start, an application with roadside assistance functionality may open or execute on the user's device and the user may proceed to request the service from the application. The request may be made using a benefit model or a pay per use model as discussed below with FIG. 4.

In another example, by communicating with the vehicle 202, the system may determine if tire pressure is low or if a tire is flat. The user device 241 may send the user a notification alerting the user of low tire pressure or a flat tire and may ask if the user wants to proceed with a roadside assistance for a tire repair or tire change. If the user agrees to the service, an application with roadside assistance functionality may open on the user's device 241 and the user may proceed to request the service via the application.

In yet another example, by communicating with the vehicle 202, the user device 241 may determine if the engine condition indicates that the vehicle 202 should not be driven. In this case, the roadside assistance system 200 may recommend the vehicle be towed to a repair shop. The user device 241 may display a notification alerting the user that the vehicle 202 should not be driven. The notification may ask if the user wants to proceed with roadside assistance for a tow. If the user agrees to the tow, an application with roadside assistance functionality may open or execute on the user device 241 and the user may proceed to request the tow via the application.

In step 320, the roadside assistance system 200 may optionally generate a recommendation for a service and may transmit the generated recommendation to a user or display the generated recommendation. For example, user device 241 may use machine learning engine 227 to generate a recommendation for a service. Alternatively, roadside assistance server 201 may generate a recommendation for a service and transmit the recommendation to user device 241. The service may be a vehicle repair service (e.g., repair of flat tire, brakes, jumpstart, etc.), or other service such as a vehicle towing service, vehicle lockout service, or fuel delivery service. The system may use information obtained from the sensors 212 and/or information obtained from the vehicle's OBD system 211 to generate the recommendation for a service. Information obtained from the sensors 212 and/or OBD system 211 may be used to create a feature vector. The feature vector may contain a representation of location of the vehicle 202 and/or weather conditions (such as temperature, precipitation, icy, snow levels). The feature vector may also contain features generated using data from the sensors 212 and/or OBD system 211 such as oil pressure, fuel level, engine temperature, tire pressure, or any other measurement from a sensor within the vehicle. The roadside assistance system 200 may use the feature vector in a recommendation algorithm to recommend a service. The roadside assistance system 200 may use any recommender algorithm to make a recommendation including collaborative filtering or matrix decomposition. The roadside assistance system 200 may use neural networks to make recommendations for services. When recommending a service, the system 200 may use a database that contains historical roadside service data such as database 255. The historical roadside service data may indicate what services other users have requested and the driving conditions and/or vehicle conditions (including data generated by an OBD system and sensors of a vehicle) at the time each service was requested. The system 200 may generate a recommendation for a service if the service was requested by a user with similar driving conditions and/or vehicle conditions. The system 200 may use the historical roadside service data contained in database 255 to train a machine learning algorithm (e.g., neural network, multilayer perceptron, decision tree, etc.) to generate the recommendation for a service.

Using machine learning as described above, the roadside assistance system 200 may determine that the vehicle has a potential problem but is not in a critical condition where it should not be driven. The roadside assistance system's recommendation for a service may include one or more service locations that a user may take the vehicle to address the potential problem with the vehicle.

In step 330, roadside assistance system 200 may send a request for roadside assistance. For example, user device 241 may send a roadside assistance request to roadside assistance server 201. The request may contain vehicle information, sensor information as described above, and/or a type of service request (flat tire repair, jumpstart, oil change, tow, fuel delivery, etc.). The request may contain location information of the user or vehicle 202. The user may indicate in the request for roadside assistance whether the user will enroll in a roadside assistance benefits program or use a pay per use model for payment of the roadside assistance. The request may be sent upon input from a user or the request may be sent automatically (e.g., by the vehicle interface engine after it determines a service to recommend).

A user may enter information for the roadside assistance request through a graphical user interface (GUI). Information may include the make, model, and/or year of the vehicle that needs roadside service. The information may include the location of the vehicle, which may be input by the user or automatically populated in the GUI from GPS data. Alternatively the roadside assistance system 200 (e.g., the vehicle interface engine 210 implemented on user device 241) may communicate with vehicle 202 to determine make, model, year, location of vehicle, location of damage on vehicle (e.g., which tire needs to be fixed) automatically without requiring the user to input the information manually. The information may include image data, such as pictures or videos, that show the location of the vehicle. The image data may be captured by the sensors 212 (e.g., cameras) of the vehicle 202. The pictures may also indicate damage to the vehicle 202, and/or difficulty of towing the vehicle (e.g., whether the vehicle is stuck in a ditch). The roadside assistance system 200 (e.g., user device 241) may show the information to the user to confirm it before it is sent (e.g., to roadside assistance server 201 and/or service provider device 251). A user may make the request by input using button 710 of FIG. 7.

A user may make a request for roadside assistance using spoken words. The request may be made by speaking to a listening device (such as an Amazon Echo or Google Home) or a mobile device with a personal assistant. Aspects associated with using natural language in roadside assistance system 200 are discussed more fully below with respect to FIG. 8.

In step 340, the roadside assistance system 200 (e.g., user device 241 or roadside assistance server 201) may determine a purchase type for the user requesting roadside assistance. Aspects associated with this step are discussed more fully below with respect to FIG. 4.

In step 350, the roadside assistance system 200 may identify the requesting application. For example, roadside assistance server 201 may identify an application used to make the request. The roadside assistance server 201 may identify the requesting application based on information contained in the roadside assistance request from step 330 of FIG. 3. For example, an application identifier may be sent as part of the request for assistance. The application identifier may enable the system to determine an account to send payment to when a user pays for roadside assistance. The application identifier may identify a particular instance of an application (e.g., the instance of the application running on user device 241) or it may identify the application generally (e.g., with no indication of what specific device the application is running on). For example, a wireless service provider application may be identified by the number 877234, or other unique identifier generated for the application, across all devices that use the wireless service provider application.

In step 360 the roadside assistance system 200 may determine a number of service providers that may perform roadside service to the user that made the request. Step 360 may be performed by roadside assistance server 201 or user device 241. The roadside assistance system 200 may determine service providers based on a comparison between the location of the service provider and the location of the vehicle 202 or the user device 241 making the request. For example, the roadside assistance system 200 may determine service providers that are within a distance (e.g., 5 miles, 10 miles, 50 miles, etc.) of the vehicle or the user device 241. Additionally/alternatively the roadside assistance system 200 may determine service locations based on traffic conditions. The roadside assistance system 200 may determine driving time between each service location and the location of the vehicle 202 that is in need of roadside assistance. Additionally/alternatively the roadside assistance system 200 may determine the driving time between each service location and the location of the user device 241 that is making the roadside assistance request. The driving time may factor in traffic, weather, construction, road, or other conditions. For example, the roadside assistance server 201 may determine a number (e.g., 1, 3, 10, etc.) of service providers with the shortest driving time between the location of the service provider and the location of the user or vehicle needing service.

In step 370, the roadside assistance system 200 may obtain service information from a service provider. The system may send a service request to one or more service providers determined in step 360. For example, roadside assistance server 201 may send a service request to roadside service provider device 251. The roadside assistance system 200 may send a service request to the roadside service provider device that is closest by distance to the vehicle 202 or user device making the request. The roadside assistance system 200 may send a service request to the service provider that is closest by driving time to the user or vehicle making the request. The system may send a service request to multiple service provider devices and may choose the service provider that is able to provide assistance to the vehicle or user at the earliest time. The roadside assistance system 200 may select a service provider based on a combination of distance, driving time, and how early the service provider is able to provide assistance to the vehicle 202 or user.

One or more service providers may respond to the service request. For example, roadside assistance server 201 may receive service information from roadside service provider device 251. The service information may include a time of departure from the service provider's location, an estimated time of arrival to the user or vehicle's location, and/or the name of the person providing the service. Service information may include the make, model, year, and/or license plate of the vehicle being used by the service provider to assist the user or repair the vehicle 202 that needs roadside assistance. Service information may include an estimated cost of repair of the vehicle 202 and/or an estimated length of time to repair the vehicle 202 or provide other assistance (e.g., estimated time to complete towing the vehicle 202).

The service provider may periodically update the service information as the service progresses. For example, the service provider may send, using roadside service provider device 251, a location of the service vehicle as it travels to the user or to the location of roadside assistance. User device 241 may display a map to the user that shows the location of the service vehicle and its estimated arrival time at the user's location. The service information may be sent from roadside service provider device 251 to roadside assistance server 201, and then from roadside assistance server 201 to user device 241.

Figure 4:
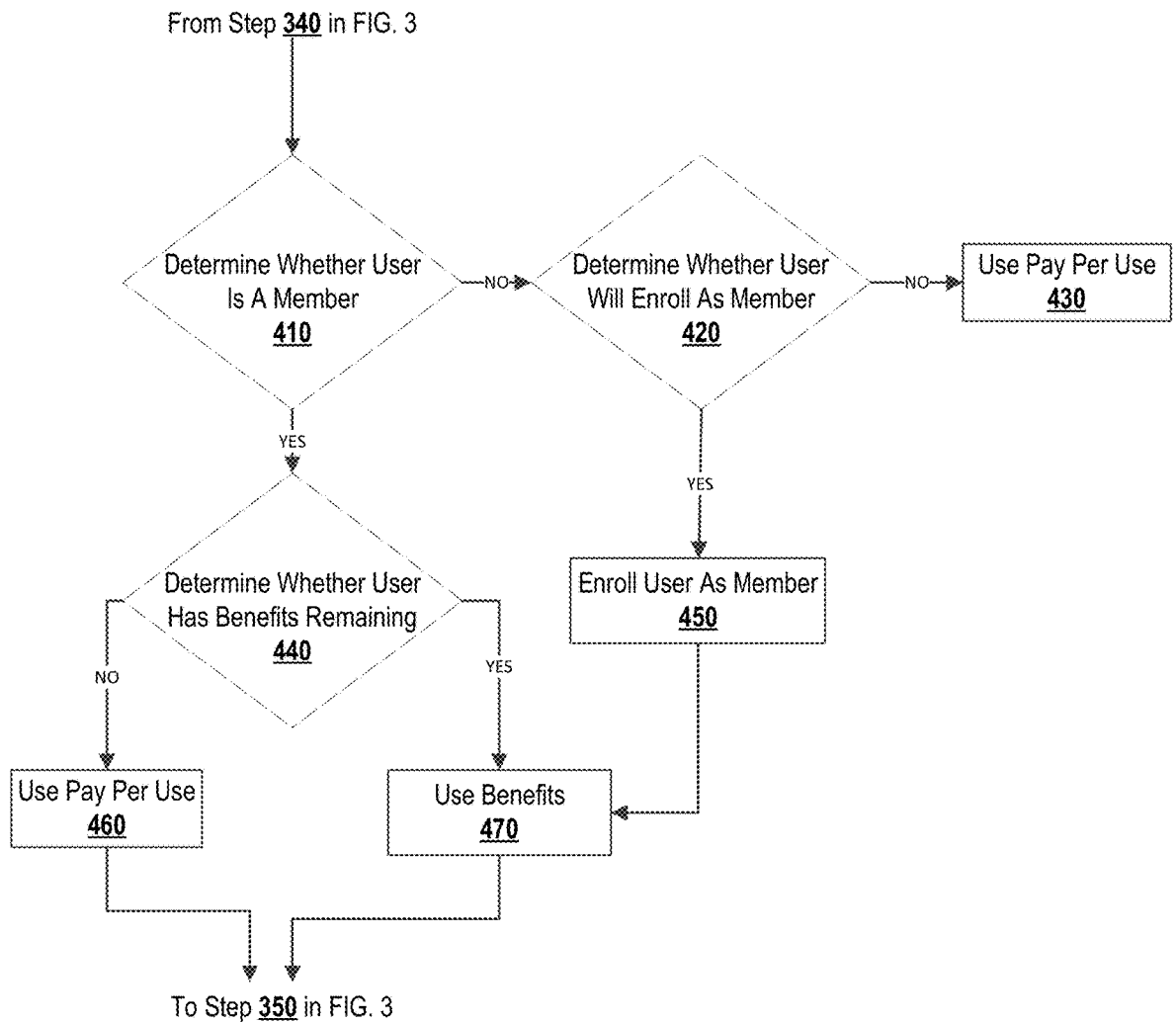
FIG. 4 is a flow diagram illustrating an example of determining a purchase type, according to step 340 of FIG. 3 and in accordance with one or more aspects described herein.

Referring to FIG. 4, a flow diagram is shown illustrating an example of determining a purchase type, according to step 340 of FIG. 3. The steps described in reference to FIG. 4 may be performed by parts of roadside assistance system 200 such as user device 141 or roadside assistance server 201.

In step 410, the roadside assistance system 200 may determine whether the user associated with the request for roadside assistance is a member of a benefits plan. The roadside assistance system 200 may make this determination based on the information provided in the roadside assistance request. For example, the system may use a user identifier to lookup the user in a member database.

If the roadside assistance system 200 determines that the user is not a member of a benefits program, the system may determine whether the user will enroll as a member in step 420. For example, roadside assistance server 201 may determine, based on data provided with the roadside assistance request, whether a user would like to enroll as a member. In some examples, the roadside assistance system 200 may use machine learning to predict whether a user will enroll. For instance, the roadside assistance system 200 may generate a recommended benefit package based on what other people in similar situations or similar vehicles have previously chosen. For instance, the roadside assistance system 200 may use features such as the estimated number of miles driven; the make, model, and/or year of car; the location of the driver or vehicle; the age of the driver; the type of driving (commute, pleasure, work, etc.); the income level of the driver; type of vehicle (e.g., sedan, sport-utility vehicle, compact car, convertible, sports car, coupe, luxury vehicle, minivan, truck, etc.); and/or price of vehicle to generate a recommendation. For example, these features may be used in a machine learning algorithm to recommend a benefit package to a user. For example, the roadside assistance system may generate a decision tree model using historical roadside service data contained in historical roadside service database 255. For a new user, the roadside assistance system 200 may use the decision tree to recommend a benefits package based on the features (mentioned above) of the new user. Any machine learning algorithm (e.g., neural network, naïve Bayes, clustering algorithms, etc.) may be used to recommend a benefit package to the user.

If the roadside assistance system 200 (e.g., user device 241 or roadside assistance server 201) determines that the user will not enroll as a member the roadside assistance system 200 (e.g., user device 241 or roadside assistance server 201) may determine to use a pay per use payment program in step 430. If the system 200 determines that the user will enroll as a member then the system may enroll the user as a member. The onboarding engine 230 may be implemented on roadside assistance server 201 and may create an account for the user with the user's information. The system 200 (e.g., user device 241 or roadside assistance server 201) may create an account for the user based on the benefits package the system recommended for the user in step 420. The system 200 may keep track of the membership benefits of the user (e.g., how many benefits have been used and how many remain unused). The system 200 may keep track of the expiration date of the user's benefits and may notify the user to renew the benefits. User device 241 may allow the user to enroll in a benefits package without changing the application the user is currently using. For example, if a user is using a social media application (such as the social media application illustrated in FIG. 6) on user device 241 to make a roadside assistance request, then the user may enroll in a benefits program from within the same social media application. The system 200 may enroll the user in a benefits program without opening or installing an additional application. The roadside assistance system 200 may proceed to step 470 to use the user's benefits as described below.

If the roadside assistance system 200 (e.g., user device 241 or roadside assistance server 201) determines that the user is a member of a benefits program in step 410, then the system may proceed to step 440 and determine whether the user has any benefits remaining. The roadside assistance system 200 (e.g., user device 241 or roadside assistance server 201) may evaluate an account associated with the user to determine whether benefits remain. If no benefits remain, then the system may proceed to step 460 and use a pay per use payment plan. If benefits are available for use, then the system 200 (e.g., user device 241 or roadside assistance server 201) may proceed to step 470 and use benefits as payment for roadside assistance. The roadside assistance system 200 may then continue to step 350 in FIG. 3 as described above.

Figure 5A:
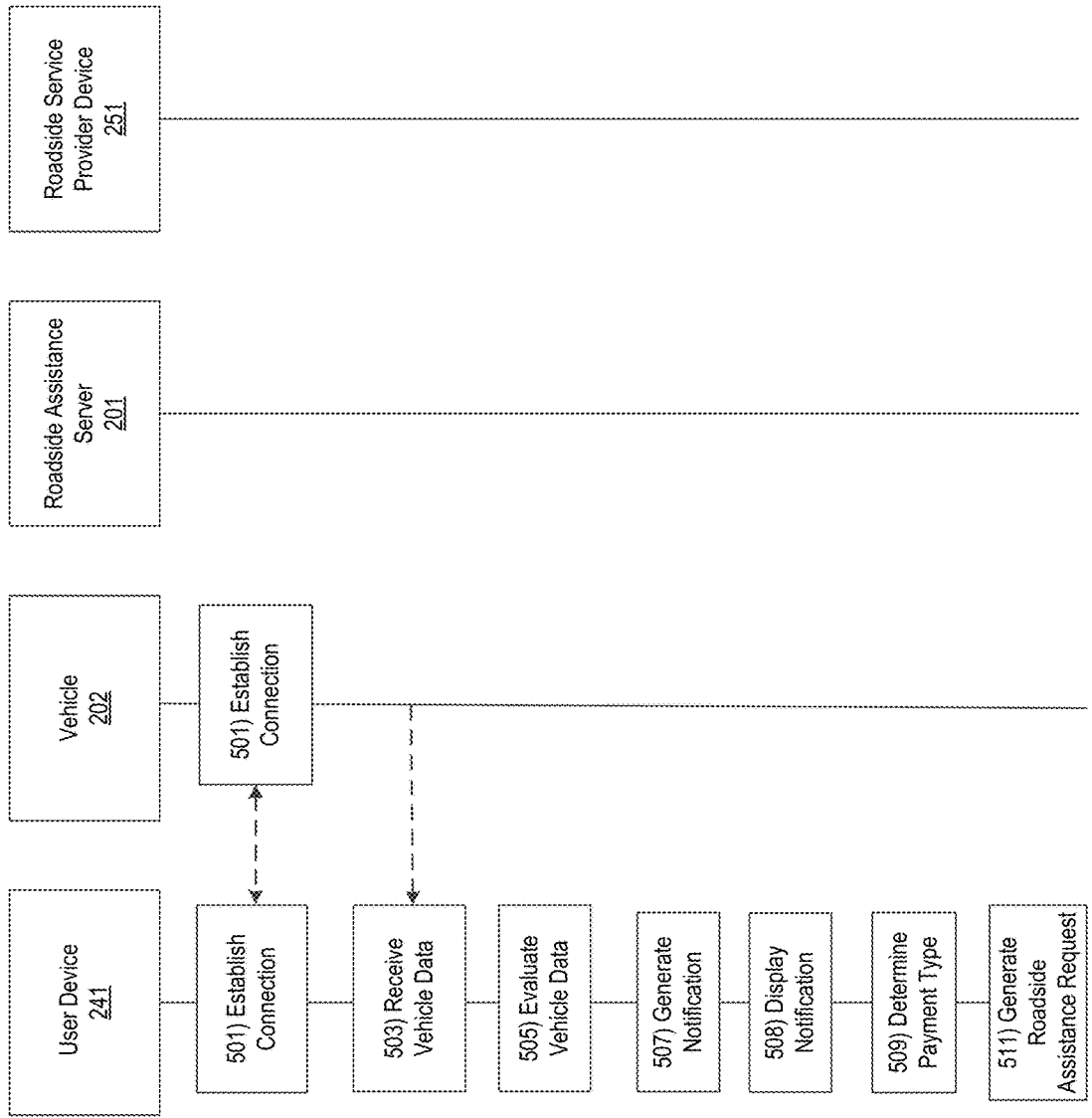
FIGS. 5a-5c illustrate an example sequence diagram illustrating an additional roadside assistance process according to one or more aspects of the disclosure.
Figure 5B:
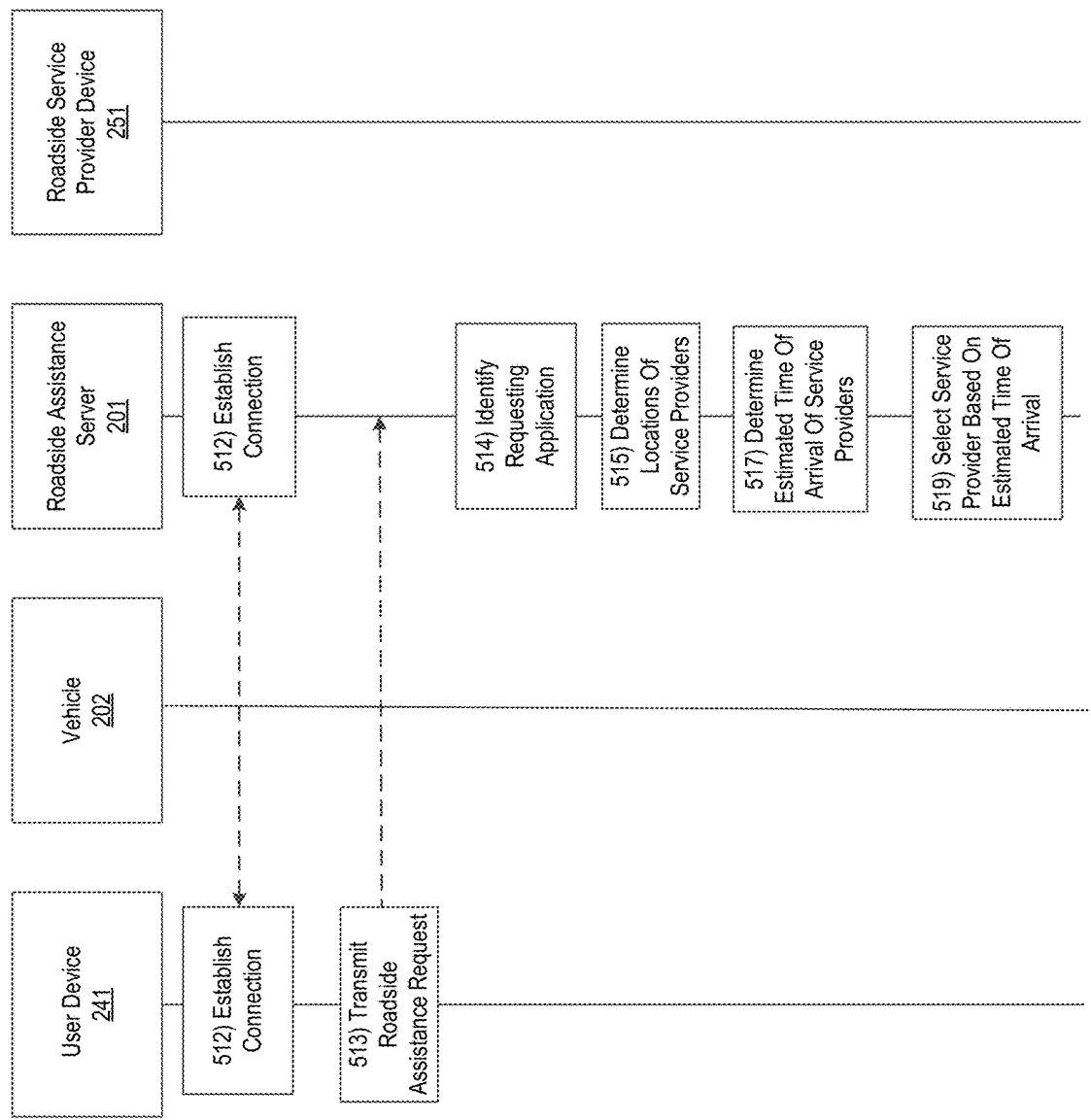
Figure 5C:
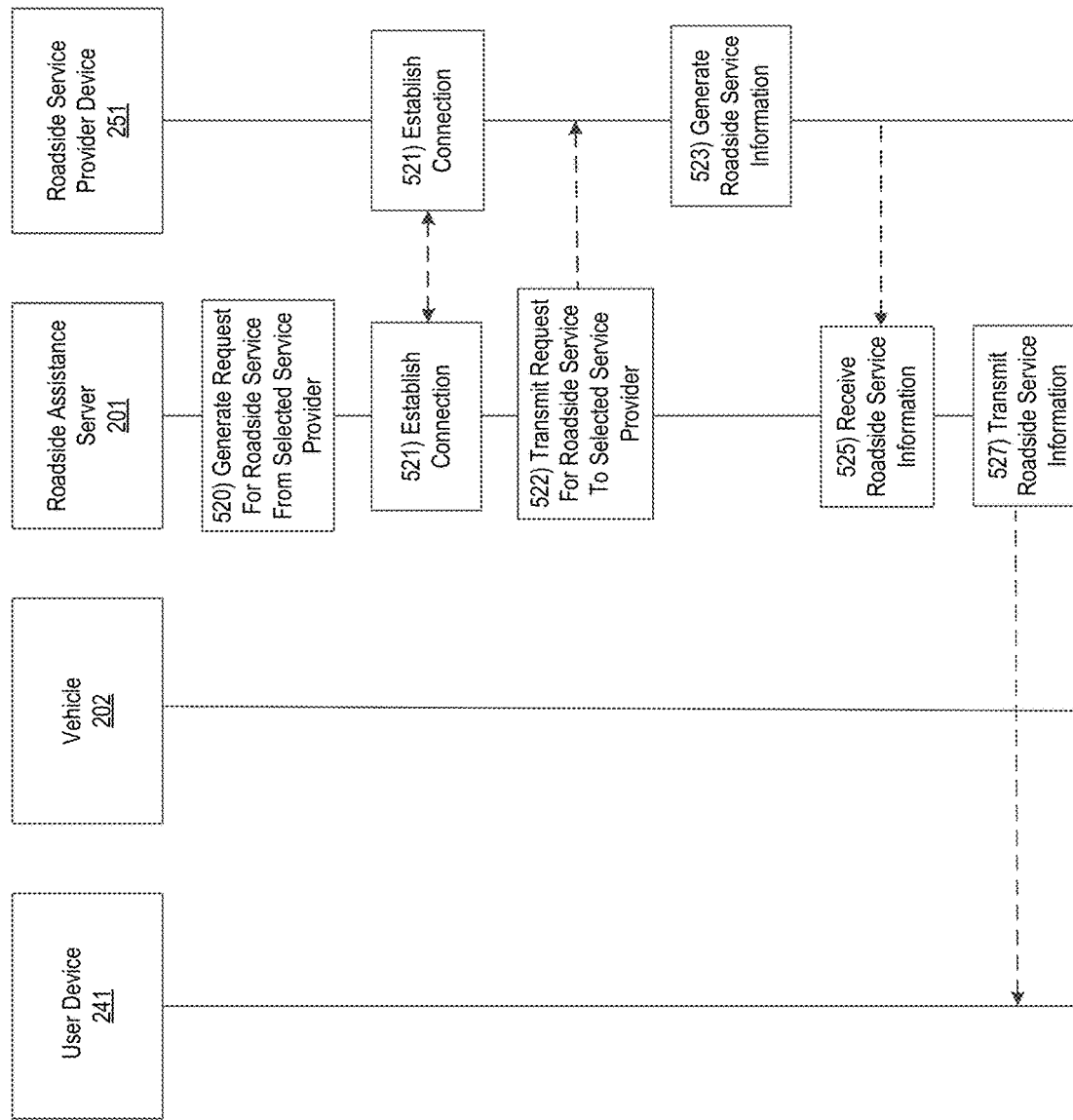

FIGS. 5a-5c depict an example sequence diagram illustrating an additional roadside assistance process. Referring to FIG. 5a, at step 501 the user device 241 may establish a connection with vehicle 202. At step 503, the user device 241 may receive vehicle data from vehicle 202 (from the OBD system 211 or sensors 212 of the vehicle). Received information may indicate performance characteristics of one or more systems within the vehicle. Received information may include, for example, tire pressure, battery level, fuel level, diagnostic codes that may indicate a problem with the vehicle, etc. The vehicle data may be generated by the vehicles sensors 212. At step 505, the user device 241 may evaluate the vehicle data. The evaluation may include determining a part of the vehicle that needs repair and/or generating a recommendation for a type of roadside assistance (e.g., tow, jumpstart, fuel delivery, tire repair, etc.). The user device 241 may use diagnostic codes received from the vehicle to determine what is wrong with the vehicle. The user device 241 may compare sensor data with a threshold and may determine that there is a problem with the vehicle based on the comparison. For example, if the tire pressure is below a threshold then the user device 241 may determine that the vehicle has a flat tire. The evaluation may also include a recommendation generated using a machine learning algorithm that has been trained on data in the historical roadside service database 255.

At step 507, the user device 241 may generate a notification for the user that indicates the repair that is needed and/or the recommendation for type of roadside assistance. At step 508 the user device 241 may cause the notification to display on a screen of the user device. Additionally/alternatively user device 241 may output audio to notify the user of the repair or recommendation for type of roadside assistance. The audio may include natural language generated by user device 241 or roadside assistance server 201.

At step 509 the user device 241 may determine a payment type (e.g., pay per use or use member benefits) for roadside assistance. The user device 241 may prompt the user for input to determine the payment type. The user device 241 may generate and/or output natural language to ask the user what the user's preferred payment type is. At step 511 the user device 241 may generate a roadside assistance request. The roadside assistance request may be generated based on the determined payment type, the evaluation of the vehicle, input from a user indicating a roadside assistance service that is desired from the user, and/or the recommendation for type of roadside assistance. The roadside assistance request may contain a location of the user or vehicle that needs assistance. Referring to FIG. 5b, at step 512, user device 241 may establish a connection with roadside assistance server 201. At step 513, user device 241 may transmit the roadside assistance request to roadside assistance server 201.

At step 514, the roadside assistance server 201 may receive the roadside assistance request and, based on the request, may identify the requesting application. For instance, the roadside assistance request may contain an application identifier (e.g., a number) that the roadside assistance server 201 may use to identify the requesting application. At step 515, the roadside assistance server 201 may determine locations of service providers that are able to provide roadside assistance. For instance, the roadside assistance server 201 may communicate with a map service server to determine roadside service companies that are within a threshold distance of the user's or vehicle's location. At step 517, roadside assistance server 201 may determine the estimated time of arrival of the service providers to the service requester's location. For instance, based on a current location of the user or vehicle in need of assistance, the system may determine a distance from the location of each service provider and may calculate a time to travel between the respective location of the service provider and the user. At step 519, roadside assistance server 201 may select a service provider based on the estimated times of arrival determined in step 517. For instance, determined estimated arrival times may be ranked or prioritized and the service provider with the earliest estimated arrival time may be selected.

Referring to FIG. 5c, at step 520, the roadside assistance server 201 may generate a request for roadside service from the selected service provider. At step 521, the roadside assistance server may establish a connection with the selected roadside service provider device 251. At step 522, the roadside assistance server 201 may transmit the request for roadside service to selected roadside service provider device 251. At step 523, roadside service provider device 251 may receive the request for roadside service and may generate roadside service information such as an estimated time of arrival, the roadside service provider device's current location, and estimated cost. At step 525, roadside assistance server 201 may receive roadside service information from roadside service provider device 251. At step 527, roadside assistance server 201 may transmit the roadside service information to user device 241 and may cause the information to be displayed on the display. In some examples, natural language generation may be used to generate an audible indication of the information and transmit the information to the user via the audible indication.

Figure 6:
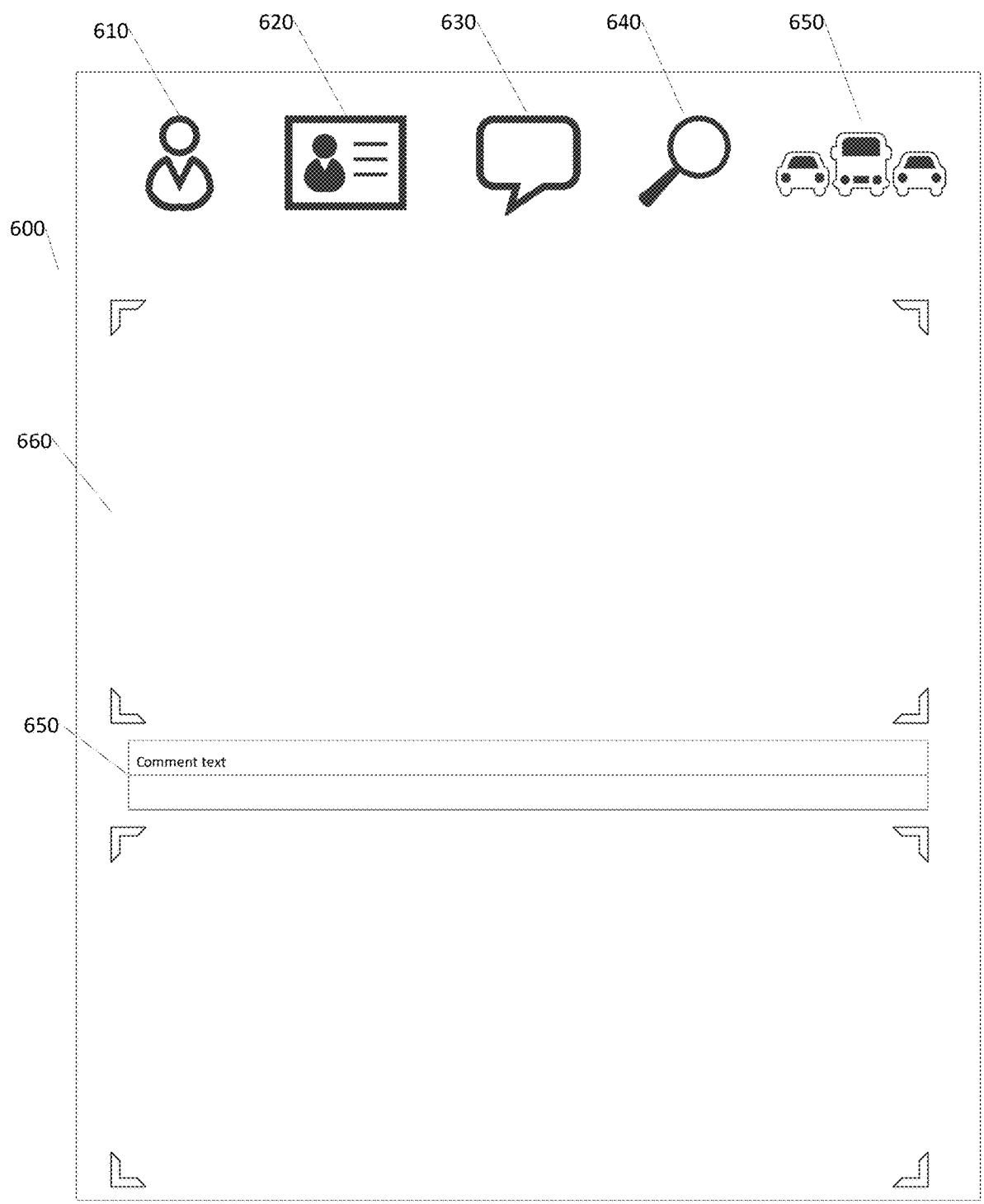
FIG. 6 depicts an example graphical user interface illustrating roadside assistance functionality added to an application using, for example, a roadside assistance API, in accordance with one or more aspects described herein.

FIG. 6 depicts an example graphical user interface illustrating roadside assistance functionality added to an application using, for example, a roadside assistance API, in accordance with one or more aspects described herein. GUI 600 shows the user interface of a social media application. Area 660 shows a location where a user may post something to their user page. Area 650 shows a location where users may make comments on a post contained in area 660. Icons 610-650 represent buttons a user may click on or tap to access different functions of the social media applications. For example icon 610 may allow a user to access his or her profile information. Icon 620 may allow a user to access his or her newsfeed. Icon 630 may allow a user to access a chat feature. Icon 640 may allow a user to search for information. Icon 650 may allow a user to access a roadside assistance feature of the social media application. By tapping or clicking icon 650, a user may be able to initiate steps of FIG. 3-5 as explained throughout this disclosure.

Although FIG. 6 shows how roadside assistance API may be used to add roadside assistance features to a social media application, it is important to note that roadside assistance features may be added to any type of application. For example, the roadside assistance API may be used to add roadside assistance functionality to applications for accessing insurance information, restaurant or food related applications, calendar applications, news applications, shopping applications, security applications (including device security and home security applications), financial applications (e.g., banking), entertainment such as games or movie/TV show streaming applications, travel applications, educational applications (such as applications that help someone learn a language), business applications, organizational applications, applications that assist a user to find and pay for parking, etc. The applications may be for any type of device including mobile, desktop computers, servers, etc. The applications may be made for any type of operating system.

Figure 7:
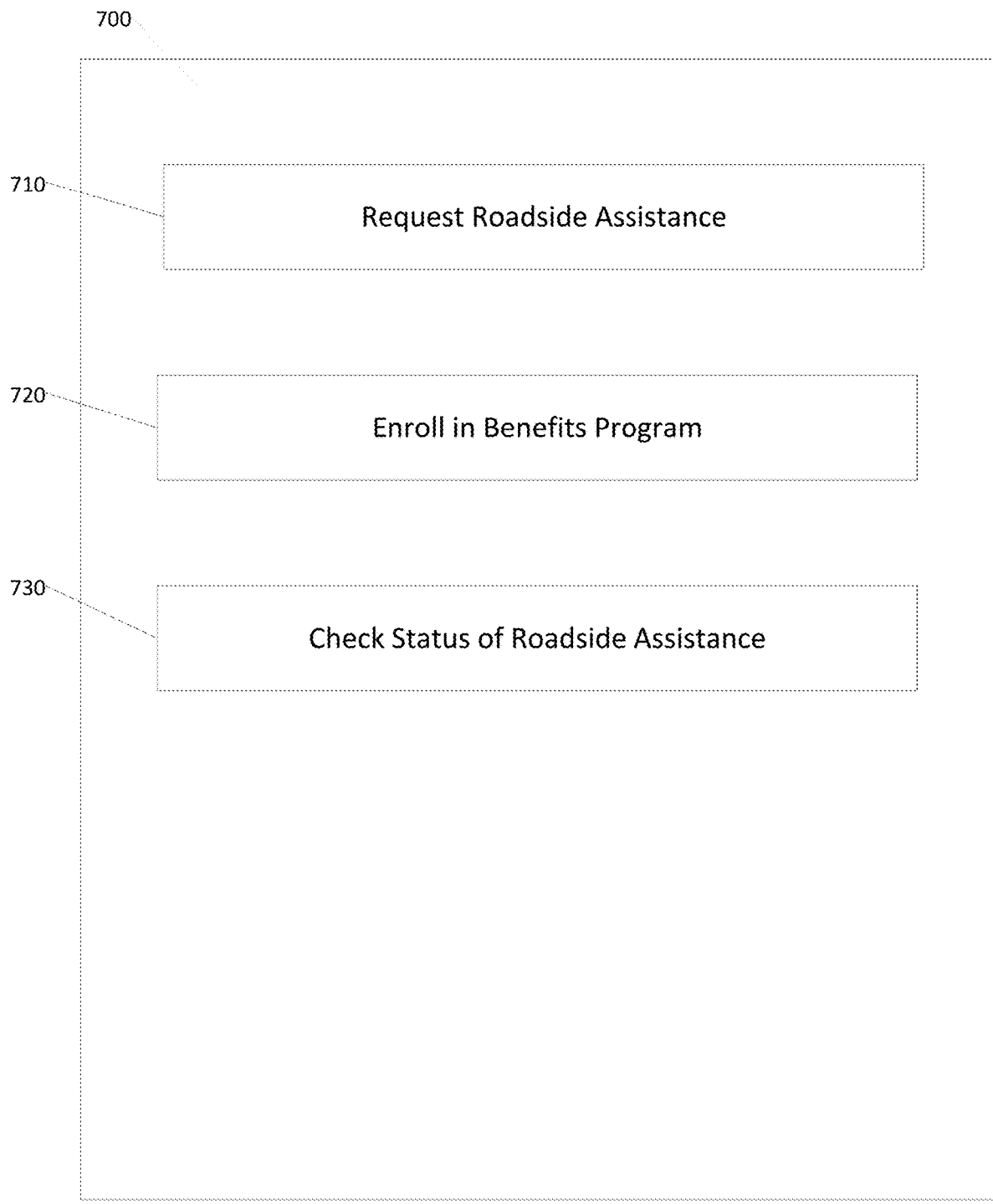
FIG. 7 depicts another example graphical user interface illustrating roadside assistance functionality added to an application using a roadside assistance API, according to one or more aspects described herein.

FIG. 7 depicts another example graphical user interface illustrating roadside assistance functionality added to an application using a roadside assistance API, according to one or more aspects described herein. GUI 700 may be accessed after interacting with icon 650 of FIG. 6. By interacting with button 710, a user may be able to input information and send a roadside assistance request as discussed above. By interacting with button 720, a user may be able to enroll in a benefits program for roadside assistance. By interacting with button 730, a user may be able to check the status of his or her roadside assistance request. After interacting with button 730 the system may show whether a service provider has been found, the location of the service provider vehicle (e.g., as it travels towards the user to provide service), or any other service information including service information described elsewhere in this disclosure.

Figure 8:
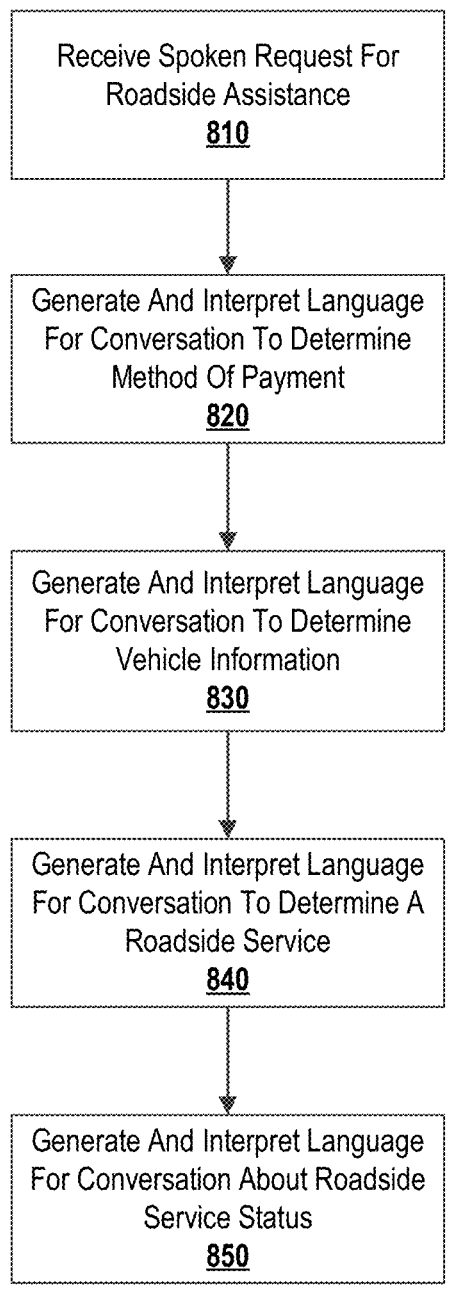
FIG. 8 is an example flow diagram that illustrates the use of natural language processing for roadside assistance according to one or more aspects described herein.

FIG. 8 is an example flow diagram that illustrates the use of natural language processing for roadside assistance according to one or more aspects described herein. The steps in FIG. 8 may be performed by devices that are part of roadside assistance system 200. For example, each step may be performed by natural language processing engine 225. Natural language processing engine may be a component, including hardware and/or software, of roadside assistance server 201 or user device 241. In each step described below, the roadside assistance system 200 may output audio containing spoken language to a user. To accomplish the steps below the roadside assistance system 200 may use a variety of natural language processing techniques including speech recognition, natural language understanding, and natural language generation. The roadside assistance system 200 may use parsing to group words together and to determine a part of speech of each word. The roadside assistance system 200 may also use named entity recognition to assist in natural language understanding. The roadside assistance system 200 may use one or more neural networks to assist with natural language understanding (including parsing speech input from a user) and natural language generation. For example, a neural network may be used to parse speech input from a user to determine an intent of speech input.

At step 810, the roadside assistance system 200 may receive a spoken request for roadside assistance. For example, a device, such as user device 241, may receive a spoken request for roadside assistance. To make a request a user may say "Assistant, I need a roadside rescue." The natural language processing (NLP) engine 225 may be implemented on the user device 241 and may process the spoken request. In other examples, the user device 241 may transmit the request to roadside assistance server 201 for processing via the NLP engine 225. The NLP engine 225 may generate a response to be output, for example, by device 241. For example, the natural language processing engine may generate "I'm sorry to hear that you need Roadside Help." In some aspects the user may ask the user device 241 to determine whether anything is wrong with the vehicle. For example, a user may say "Assistant, run car diagnostics." The NLP engine 225 may determine the intent of the user's words and may cause user device 241 to retrieve information from the vehicle. The roadside assistance system 200 (e.g., user device 241 or roadside assistance server 201) may analyze the vehicle information to determine if there are any problems with the vehicle. The NLP engine 225 may then generate language to inform the user of a problem. For example the NLP engine 225 may generate and cause user device 241 to output, "I have run a full diagnostic on your car and have found that you battery is low and will not start the car. If you want me to try to start the car say: Assistant start my car or if you want me to request a jump start say: Assistant, roadside rescue."

At step 820, the roadside assistance system 200 may generate and interpret language for a conversation to determine a method of payment. To determine a method of payment, the NLP engine 225 may generate language to be output by the user device 241. For example, the NLP engine 225 may generate and output "let me check your Acme Roadside account to see if you have benefits. I see you have 2 claims left to use. Would you like me to request a Roadside Rescue for you?" If no benefits are found, then the system 200 may generate language to ask the user if he or she would like to pay using an alternative method (e.g., credit/debit card). The roadside assistance system 200 may engage in a conversation to obtain the information (e.g., credit card number, security code, password, etc.) necessary for the alternative payment method.

At step 830, the roadside assistance system 200 may generate and interpret language for a conversation to determine vehicle information. The system 200 may have saved vehicle information of the user making the request. The NLP engine 225 may generate language based on the saved vehicle information. For example, if the system 200 has saved vehicle information corresponding to a 2017 Honda Accord, then the NLP engine 225 may generate the language, "is this for the 2017 Honda Accord?" The user may respond by saying "yes." If the vehicle information does not correspond to the vehicle for which the user is requesting roadside assistance, the system 200 may engage in a conversation to obtain the correct vehicle information (e.g., year, make, model of a car). The roadside assistance system

200 may generate language to obtain other vehicle information such as the location of the vehicle. For example, the NLP engine 225 may generate the language "Is the car currently located at your home address 314 E Brinley Street?" or "where is the car located?" The user may respond the vehicle's location and the NLP engine 225 may interpret the response and cause the vehicle's location to be saved in memory.

At step 840, the roadside assistance system 200 may generate and interpret language for a conversation to determine a roadside service. For example the NLP engine 225 may generate the language, "What service would you like, Tire Change, Jump Start, Fuel deliver, Lockout or Tow?" and cause user device 241 to output the language. The user may respond by saying "tire change." The NLP engine 225 may interpret the user's input and generate language to gather more information about the service. For example, the NLP engine may generate language to ask if the user has a spare tire or not.

At step 850, the roadside assistance system 200, may generate and interpret language for a conversation about the status of the roadside service. The NLP engine 225 may generate language to notify the user that the roadside service is being arranged. For example, the NLP engine 225 may generate the language "please stand by while I request your tire change." The NLP engine may generate language to inform the user about the roadside service after the service has been arranged. For example the NLP engine 225 may generate the language "your tire change is booked and the provider is Mike's Towing located at 111 S. East Street. The number is 773-674-1234. The estimated time of arrival is 35 minutes. Would you like for me to send you a text so that you can track the driver?" If the user responds with a "yes," then the NLP engine 225 may generate language such as "Text sent. I will be here to provide you update on the rescue. Just say: Assistant, roadside rescue update. If you want to cancel the rescue just say: Assistant, cancel roadside rescue."

The system 200 may provide updates to the user about the status of the roadside service. The user may say out loud "Assistant, roadside rescue update," to which the NLP engine 225 may generate and output audio that says "the driver is now ENROUTE to your location and the ETA 20 minutes." The NLP engine may generate updates without input from the user. For example, if the service vehicle arrives to the user's location, then the NLP engine 225 may generate and output "the service vehicle is onsite."

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

The invention claimed is:

1. A method comprising:
receiving, by a mobile device and from an on-board diagnostic system of a vehicle, vehicle information indicating a service is needed for the vehicle, wherein the mobile device is executing an application implementing a roadside assistance application programming interface (API);
displaying, on a display of the mobile device via the application, information related to the service;
receiving, by the mobile device, voice input from a user corresponding to the information;
determining, by parsing the voice input with a neural network, an intent of the voice input, wherein the intent of the voice input indicates a roadside assistance request;
sending, from the mobile device and to a roadside assistance server, the roadside assistance request, wherein the roadside assistance request comprises a type of service to be performed on the vehicle and a location of the vehicle;
receiving, from the roadside assistance server, a benefits enrollment prediction, wherein the benefits enrollment prediction is generated using machine learning;
sending, based on the benefits enrollment prediction, enrollment information to the roadside assistance server; and
receiving service information via the application, wherein the service information comprises a location of a service provider vehicle that is scheduled to respond to the roadside assistance request.

2. The method of claim 1, further comprising:
generating a feature vector based on the vehicle information;
outputting the feature vector to a recommender system; and
generating, by the recommender system, a recommended type of roadside service for the vehicle, wherein the type of service is the recommended type of roadside service.

3. The method of claim 2, wherein the vehicle information comprises tire pressure information obtained from a tire pressure sensor of the vehicle and engine speed information obtained from an engine speed sensor of the vehicle.

4. The method of claim 1, wherein the roadside assistance request further comprises a benefits enrollment request and further comprising:
receiving, by the mobile device and via the application executing on the mobile device, a notification indicating that the user has been enrolled in a benefits program and indicating a type of benefits plan in which the user is enrolled.

5. The method of claim 1, wherein the location of the vehicle is obtained from a global positioning system (GPS) of the vehicle.

6. The method of claim 1, wherein the application comprises a social media application.

7. The method of claim 1, wherein the service information further comprises an estimated time of arrival, a make, a model, and a license plate number of the service provider vehicle.

8. The method of claim 1, further comprising:
engaging in a conversation with the user via a natural language processing engine of the application, wherein the roadside assistance request is generated based on the conversation.

9. A system comprising:
a computing device associated with a vehicle and an apparatus,
wherein the computing device comprises one or more processors, and memory storing machine readable instructions that, when executed by the one or more processors of the computing device cause the computing device to:
receive, by a mobile device and from an on-board diagnostic system of a vehicle, vehicle information indicating a service is needed for the vehicle, wherein the mobile device is executing an application implementing a roadside assistance application programming interface (API);

display, on a display of the mobile device via the application, information related to the service receive by the mobile device, voice input from a user corresponding to the information;

determine, by parsing the voice input with a neural network, an intent of the voice input, wherein the intent of the voice input indicates a roadside assistance request;

send, from the mobile device and to a roadside assistance server, the roadside assistance request, wherein the roadside assistance request comprises a type of service to be performed on the vehicle and a location of the vehicle;

receive, from the roadside assistance server, a benefits enrollment prediction, wherein the benefits enrollment prediction is generated using machine learning;

send, based on the benefits enrollment prediction, enrollment information to the roadside assistance server; and receive service information via the application, wherein the service information comprises a location of a service provider vehicle that is scheduled to respond to the roadside assistance request; and wherein the apparatus comprises one or more processors, and memory storing machine readable instructions that, when executed by the one or more processors, cause the apparatus to:

receive the roadside assistance request from the computing device.

10. The system of claim 9, wherein the machine readable instructions that, when executed by the one or more processors of the computing device further cause the computing device to:

generate a feature vector based on the vehicle information;

output the feature vector to a recommender system; and generate by the recommender system, a recommended type of roadside service for the vehicle, wherein the type of service is the recommended type of roadside service.

11. The system of claim 10, wherein the vehicle information comprises tire pressure information obtained from a tire pressure sensor of the vehicle and engine speed information obtained from an engine speed sensor of the vehicle.

12. The system of claim 9, wherein the roadside assistance request further comprises a benefits enrollment request and wherein the machine readable instructions that, when executed by the one or more processors of the computing device further cause the computing device to:

receive, by the mobile device and via the application executing on the mobile device, a notification indicating that the user has been enrolled in a benefits program and indicating a type of benefits plan in which the user is enrolled.

13. The system of claim 9, wherein the location of the vehicle is received from a global positioning system (GPS) of the vehicle.

14. The system of claim 9, wherein the application comprises a social media application.

15. The system of claim 9, further comprising:

engaging in a conversation with the user via a natural language processing engine of the application, wherein the roadside assistance request is generated based on the conversation.

16. An apparatus comprising:

one or more processors; and memory storing machine readable instructions that, when executed by the one or more processors cause the apparatus to:

receive, by a mobile device and from an on-board diagnostic system of a vehicle, vehicle information indicating a service is needed for the vehicle, wherein the mobile device is executing an application implementing a roadside assistance application programming interface (API);

display, on a display of the mobile device via the application, information related to the service;

receive, by the mobile device, voice input from a user corresponding to the information;

determine, by parsing the voice input with a neural network, an intent of the voice input, wherein the intent of the voice input indicates a roadside assistance request;

send, from the mobile device and to a roadside assistance server, the roadside assistance request, wherein the roadside assistance request comprises a type of service to be performed on the vehicle and a location of the vehicle;

receive, from the roadside assistance server, a benefits enrollment prediction, wherein the benefits enrollment prediction is generated using machine learning;

send, based on the benefits enrollment prediction, enrollment information to the roadside assistance server; and receive service information via the application, wherein the service information comprises a location of a service provider vehicle that is scheduled to respond to the roadside assistance request.

17. The apparatus of claim 16, wherein the machine readable instructions that, when executed by the one or more processors cause the apparatus to:

generate a feature vector based on the vehicle information;

output the feature vector to a recommender system; and generate, by the recommender system, a recommended type of roadside service for the vehicle, wherein the type of service is the recommended type of roadside service.

18. The apparatus of claim 16, wherein the vehicle information comprises tire pressure information obtained from a tire pressure sensor of the vehicle and engine speed information obtained from an engine speed sensor of the vehicle.

19. The apparatus of claim 16, wherein the location of the vehicle is obtained by the application from a global positioning system (GPS) of the vehicle.

20. The apparatus of claim 16, wherein the service information further comprises an estimated time of arrival, a make, a model, and a license plate number of the service provider vehicle.

* * * * *